Jan. 12, 1937. H. BAEHR 2,067,311
PURIFICATION OF GASES FROM AMMONIA AND HYDROGEN SULPHIDE
Filed Aug. 30, 1934
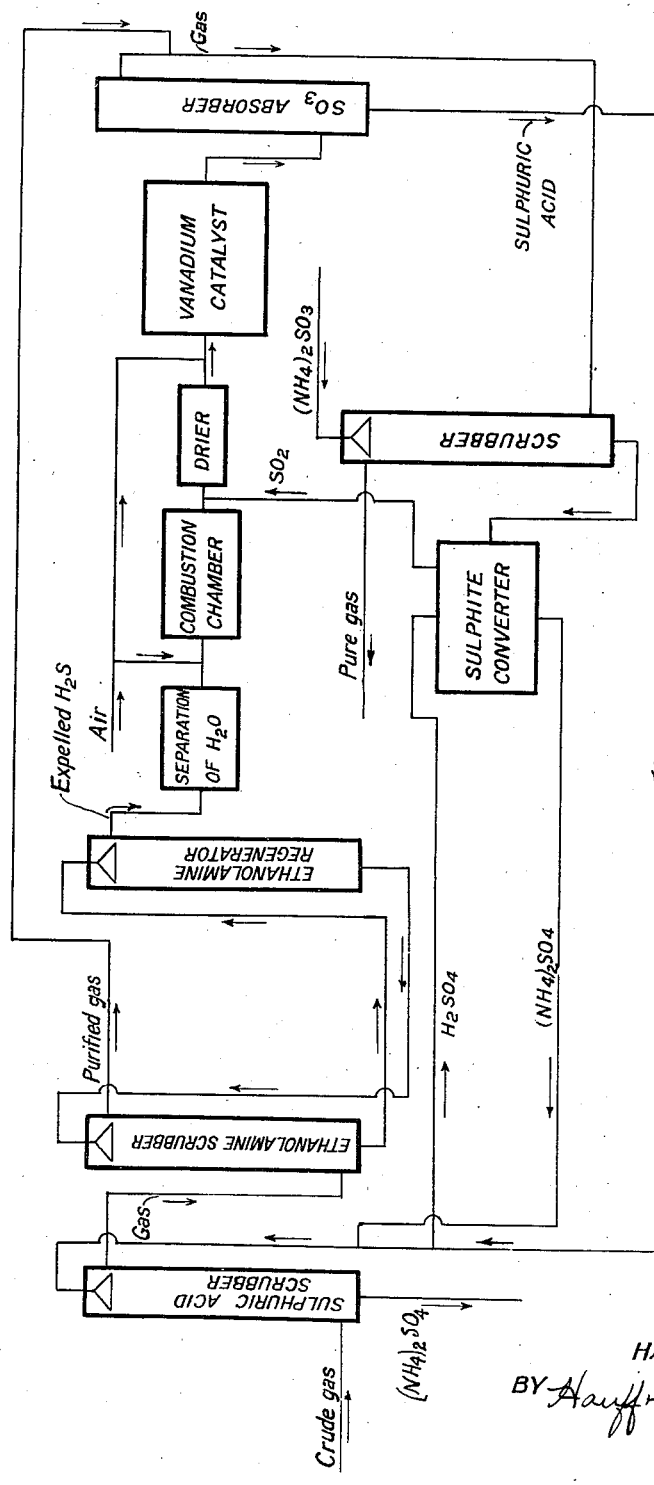
INVENTOR
HANS BAEHR
BY Hauff Sharland
ATTORNEYS Patented Jan. 12, 1937

2,067,311

UNITED STATES PATENT OFFICE 2,067,311

PURIFICATION OF GASES FROM AMMONIA AND HYDROGEN SULPHIDE

Hans Baehr, Leuna, Germany, assignor to I. G. Farbenindustrie Aktiengesellschaft, Frankfort-on-the-Main, Germany Application August 30, 1934, Serial No. 742,084
In Germany September 7, 1933

4 Claims. (Cl. 23—3)

The present invention relates to improvements in the purification of gases from ammonia and hydrogen sulphide.

For the purpose of simultaneously separating ammonia and hydrogen sulphide, and if desired also cyanogen compounds, from gases it has already been proposed to wash the gases with solutions of sulphites and bisulphites or of polythionates, preferably those of ammonium, the thionate solutions thus obtained being converted, via the polythionates into ammonium sulphate and sulphur by treatment with sulphur dioxide. This process has the drawback that not only hydrogen sulphide and ammonia but also any cyanogen compounds present are combined in the form of ammonium thiocyanate which can only be converted under high pressure in the presence of sulphuric acid. Furthermore the carrying out of the decomposition of the ammonium thiocyanate on an industrial scale is impossible due to a lack of a suitable apparatus so that the ammonium sulphate obtained by this process is contaminated with ammonium thiocyanate.

It has also been proposed to produce sulphur dioxide within the gases to be purified themselves by the catalytic oxidation of hydrogen sulphide, the sulphur dioxide and the ammonia then being separated as ammonium sulphite. By reason of the fact that ammonium sulphite is not a marketable fertilizer, it has been proposed to oxidize it with air or to convert it into ammonium sulphate under high pressure. Neither of these processes fulfills the technical requirement of being as simple as possible.

Another group of methods consists in first removing the ammonia from the gases by means of sulphuric acid and then carrying out the desulphurization of the gases by means of bog iron ore, iron oxide suspensions or arsenic compounds with subsequent oxidation of the absorbed sulphur. The first stage of the process is very expensive, since it requires sulphuric acid from a foreign source. The two other stages of the process have the drawback that during the oxidation of the sulphides formed by absorption large amounts of ammonium thiosulphate and ammonium thiocyanate are formed which cannot be directly recovered from the dilute washing liquors so that losses of from 70 to 75 per cent of the sulphur frequently occur.

More recently it has been proposed to wash out the hydrogen sulphide by means of strong organic bases, preferably such as contain one or more hydroxy-alkyl groups, as for example alkylol amines, or by means of salts having a basic action, such as alkali metal salts of amino acids. As examples of such purifying agents may be mentioned triethanolamine, diethanolamine, a mixture of monoethanolamine and boric acid, also bases with several nitrogen atoms in the molecule, as for example diamino-isopropanol, di-hydroxyethyl-ethylenediamine, polymers of ethylenediamine and their derivatives and other methylated and/or hydroxyethylated amines, furthermore tertiary potassium phosphate, alkali metal borates, the sodium salts of alanine or methylalanine or taurine or the potassium salts of hydroxyethylglycocoll or ethyl-glycocoll. When working in this manner it is similarly advisable first to separate the ammonia by means of sulphuric acid because otherwise it would pass into the washing liquor and either be liable to be separated during the regeneration in the form of ammonium carbonate or ammonium sulphide which on the one hand would clog the pipes of the plant and on the other hand would be lost during the working up of the waste gases from the regeneration, or would require special methods of working during the regeneration.

All the said processes thus have the drawback that either final solutions containing sulphite or thionate which are difficult to work up, are obtained or else the combination of the ammonia must be carried out before the removal of the hydrogen sulphide so that sulphuric acid from a foreign source is necessary.

I have now found that the separation of ammonia and hydrogen sulphide, and if desired of cyanogen compounds, from gases, especially coal distillation gases, with the recovery of ammonium sulphate, can be carried out with advantage by a combination of several steps, which consists in first removing from the gases the ammonia by means of sulphuric acid as ammonium sulphate, then removing the hydrogen sulphide from the gas by any suitable scrubbing process, for example those referred to in the foregoing, regenerating the spent scrubbing agent, thereby producing hydrogen sulphide, sulphur dioxide or sulphur, converting these products into sulphuric acid and employing the latter for the removal of the ammonia from the crude initial gas.

It will be understood that in this process the recovery of ammonia and the removal of hydrogen sulphide from the gases are carried out separately.

When it is desired to effect the separation of the hydrogen sulphide by means of bog iron ore, iron oxide suspensions or solutions of arsenic compounds or similar agents, which are regenerated by oxidation with air with the production of sulphur, the ammonia is first absorbed from the gas for the greater part by means of sulphuric acid. The remainder of the ammonia in the gas passes therewith into the plant for the absorption of the hydrogen sulphide; it serves therein as an accelerator and is converted for the greater part into ammonium thiosulphate and ammonium thiocyanate during the regeneration of the gas purifying agent by oxidation with air. The remainder of the ammonia escapes with the air used for the oxidation. The sulphur obtained by the oxidation with air is worked up into sulphuric acid, preferably by burning the sulphur to sulphur dioxide and catalytically oxidizing the latter to sulphur trioxide and the sulphuric acid is used over again for the absorption of ammonia. The waste gases from the preparation of sulphuric acid, which still contain substantial amounts of sulphur dioxide, and the air used for the oxidation of the spent gas purifying agent, which contains the residual ammonia, are washed out with water. The ammonium sulphite solution obtained is treated with a part of the sulphuric acid, the sulphur dioxide formed being worked up into sulphuric acid, together with the sulphur dioxide derived from the burning of the sulphur.

The procedure is similar when removing the hydrogen sulphide from the gases by means of strong organic bases or of salts having a basic action, which are usually employed in the form of solutions and which are regenerated by heating. The hydrogen sulphide which escapes during the regeneration of the spent absorbing media for the hydrogen sulphide, is converted into sulphuric acid by burning it to sulphur dioxide and catalytically oxidizing the latter. This sulphuric acid serves to separate the ammonia before the desulphurization process. The sulphur dioxide in the final gas formed by the preparation of sulphuric acid is washed out with ammonia and the resulting ammonium sulphite worked up into sulphate by means of a part of the sulphuric acid. The sulphur dioxide thus formed is supplied to the gases containing sulphur dioxide obtained by the combustion of the hydrogen sulphide in order to be worked up into sulphuric acid.

The process according to this invention has the advantage that to a large extent it is independent of the proportions of ammonia and hydrogen sulphide in the gases because any deficiency of sulphuric acid may be made up from a foreign source. When there is an excess of hydrogen sulphide, a part of the sulphur or sulphuric acid may be employed for other purposes. It is also possible according to this invention to work up other acids at the same time, as for example waste acids from the purification of benzene, or phosphoric acid or nitric acid or their salts, mixed fertilizers containing ammonia being obtained instead of ammonium sulphate.

The cyanogen compounds present in the gases to be purified and which pass into the gases containing hydrogen sulphide or sulphur dioxide, contrary to expectation, exert no injurious influence on the catalytic formation of sulphuric acid.

The following example will further illustrate the nature of this invention but the invention is not restricted to this example, which is given with reference to the accompanying drawing showing diagrammatically a plant arrangement for carrying out the process.

Example

Cold coke oven gas containing per cubic metre about 8 grams of ammonia, 11 grams of hydrogen sulphide and 1 gram of cyanogen compounds is washed with sulphuric acid at room temperature and thus freed from ammonia. The gas is then trickled with a 30 per cent aqueous solution of monoethanol amine, the hydrogen sulphide thus being removed from the gas. The ethanol amine solution saturated with hydrogen sulphide is regenerated by heating in a column, the amount of hydrogen sulphide which has been absorbed during the washing process and which also contains carbon dioxide and cyanogen compounds being expelled. After separating the water, this gas is mixed with air and supplied to a combustion chamber. The sulphur dioxide formed, after drying and if necessary after the addition of more air, is led over a vanadium catalyst and the resulting sulphur trioxide is absorbed in concentrated sulphuric acid. The sulphuric acid is employed for removing ammonia from the crude gas. A certain amount of ammonia remains in the gas which is added to the final gases from the manufacture of sulphuric acid. This gas mixture is trickled with ammonium sulphite solution in a washing tower. The ammonium sulphite or bisulphite thus formed is decomposed by a part of the sulphuric acid, the ammonium sulphate formed added to the sulphuric acid employed for washing out ammonia from the crude gas and the sulphur dioxide formed added to the hydrogen sulphide or to the sulphur dioxide formed by its combustion.

What I claim is:

1. The process of removing ammonia and hydrogen sulphide from a gas containing the same which comprises the steps of scrubbing said gas with sulphuric acid, thereby producing ammonium sulphate; then scrubbing said gas with an agent capable of removing hydrogen sulphide from said gas and of being regenerated; regenerating the spent scrubbing agent, thereby producing a substance selected from the group consisting of hydrogen sulphide, sulphur and sulphur dioxide; converting said substance into sulphuric acid, scrubbing the waste gases from said sulphuric acid conversion with water in the presence of ammonia, converting the resulting sulphite into gaseous sulphur dioxide and ammonium sulphate in solution, converting said sulphur dioxide into sulphuric acid and scrubbing with said sulphuric acids further amounts of gas to be treated.

2. The process of removing ammonia and hydrogen sulphide from a gas containing the same which comprises the steps of scrubbing said gas with sulphuric acid, thereby producing ammonium sulphate; then scrubbing said gas with a strong organic base; regenerating the spent base by heating, thereby expelling hydrogen sulphide; converting the hydrogen sulphide into sulphuric acid, scrubbing the waste gases from said sulphuric acid conversion with water in the presence of ammonia, converting the resulting sulphite into gaseous sulphur dioxide and ammonium sulphate in solution, converting said sulphur dioxide into sulphuric acid and scrubbing with said sulphuric acids further amounts of gas to be treated.

3. The process of removing ammonia and hydrogen sulphide from a gas containing the same which comprises the steps of scrubbing said gas with sulphuric acid, thereby producing ammonium sulphate; then scrubbing said gas with a strong organic base; regenerating the spent base by heating, thereby expelling hydrogen sulphide; burning the hydrogen sulphide to sulphur dioxide; catalytically converting the latter into sulphuric acid, scrubbing the waste gases from said sulphuric acid conversion with water in the presence of ammonia, converting the resulting sulphite into gaseous sulphur dioxide and ammonium sulphate in solution, converting said sulphur dioxide into sulphuric acid and scrubbing with said sulphuric acids further amounts of gas to be treated.

4. The process of removing ammonia and hydrogen sulphide from a gas containing the same which comprises the steps of scrubbing said gas with sulphuric acid, thereby producing ammonium sulphate, then scrubbing said gas with an ethanolamine; regenerating the spent ethanolamine by heating, thereby expelling hydrogen sulphide; burning the hydrogen sulphide to sulphur dioxide; catalytically converting the latter into sulphuric acid, scrubbing the waste gases from said sulphuric acid conversion with water in the presence of ammonia, converting the resulting sulphite into gaseous sulphur dioxide and ammonium sulphate in solution, converting said sulphur dioxide into sulphuric acid and scrubbing with said sulphuric acids further amounts of gas to be treated.

HANS BAEHR.